(12) United States Patent
Galebach et al.

(10) Patent No.: US 10,135,834 B1
(45) Date of Patent: Nov. 20, 2018

(54) SYSTEM AND METHOD OF EXECUTING OPERATIONS IN A SOCIAL NETWORK APPLICATION

(71) Applicant: Social Patent LLC, Henderson, NV (US)

(72) Inventors: Timothy S. Galebach, Park City, UT (US); Jared Bowie, Las Vegas, NV (US); Michael Chin, Belize (BZ); Stephen H. Galebach, Medford, MA (US)

(73) Assignee: Social Patent LLC, Henderson, NV (US)

( * ) Notice: Subject to any disclaimer, the term of this patent is extended or adjusted under 35 U.S.C. 154(b) by 0 days.

(21) Appl. No.: 15/789,724

(22) Filed: Oct. 20, 2017

(51) Int. Cl.
| | |
|---|---|
| *H04L 29/06* | (2006.01) |
| *G06F 17/30* | (2006.01) |
| *H04L 9/30* | (2006.01) |
| *H04L 9/14* | (2006.01) |
| *H04L 9/06* | (2006.01) |

(52) U.S. Cl.
CPC ...... *H04L 63/102* (2013.01); *G06F 17/30867* (2013.01); *H04L 9/0637* (2013.01); *H04L 9/14* (2013.01); *H04L 9/30* (2013.01)

(58) Field of Classification Search
CPC . H04L 9/0637; H04L 9/14; H04L 9/30; H04L 9/00; H04L 9/06
See application file for complete search history.

(56) References Cited

U.S. PATENT DOCUMENTS

| | | | |
|---|---|---|---|
| 2016/0203575 A1* | 7/2016 | Madhu | G06Q 50/265 705/319 |
| 2016/0283920 A1* | 9/2016 | Fisher | G06Q 20/065 |
| 2017/0091397 A1* | 3/2017 | Shah | H04L 9/3236 |

OTHER PUBLICATIONS https://github.com/ethereum/EIPs/issues/725 "ERC: Identity Issue #725 ethereum/EIPs—GitHub," retrieved from Internet Oct. 18, 2017.
https://www.youtube.com/watch?v=zpO7eH5FYdo&t=91s "Deloitte's Smart Identity platform," retrieved from Internet Oct. 18, 2017. CD provided via mail.

* cited by examiner

*Primary Examiner* — William J. Goodchild
(74) *Attorney, Agent, or Firm* — Hamilton, Brook, Smith & Reynolds, P.C.

(57) ABSTRACT

Embodiments are directed to improving social network applications using the power of the blockchain (or other repository of facts as a service). The embodiments include methods and systems that register users with a social network application coupled to the blockchain, including providing respective user identifiers recorded in the blockchain. The methods and systems, for each user, configure a set of verification parameters enabled to filter the participation of the respective user identifier in operations. The methods and systems initiate, by a querying user, an operation that causes the social network application to: (a) query the blockchain to locate attested-to facts specific to user identifiers of the registered users and (b) filter participation of at least one user identifier in the operation based on the attested-to facts meeting the verification parameters. The methods and systems execute the operation based on the filtering and return results based on the attested-to facts meeting an operation parameter of the executed operation.

41 Claims, 9 Drawing Sheets

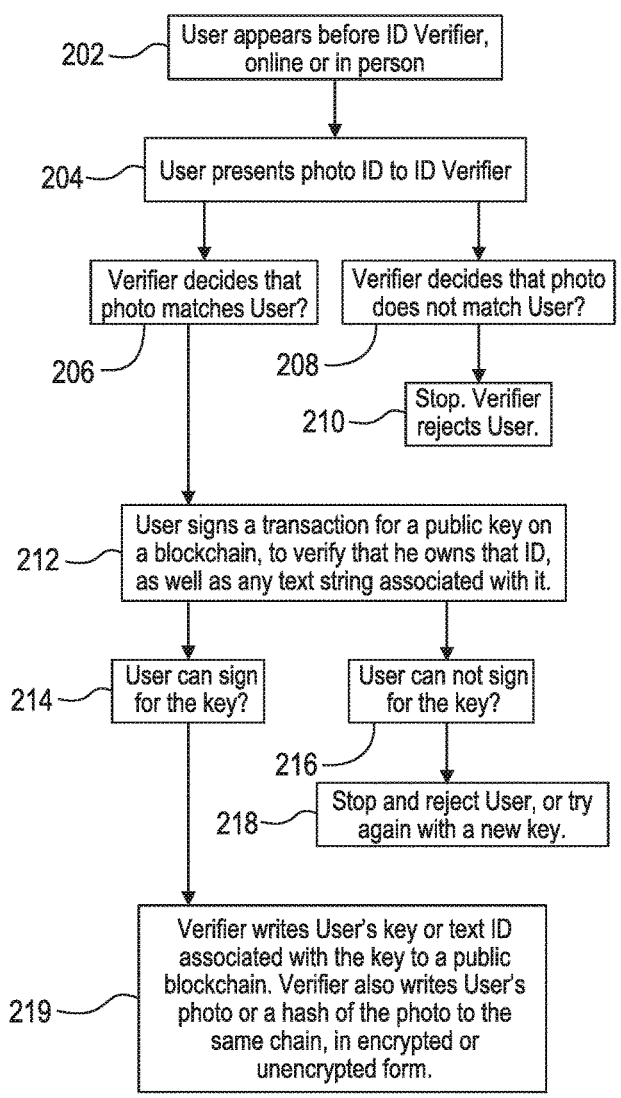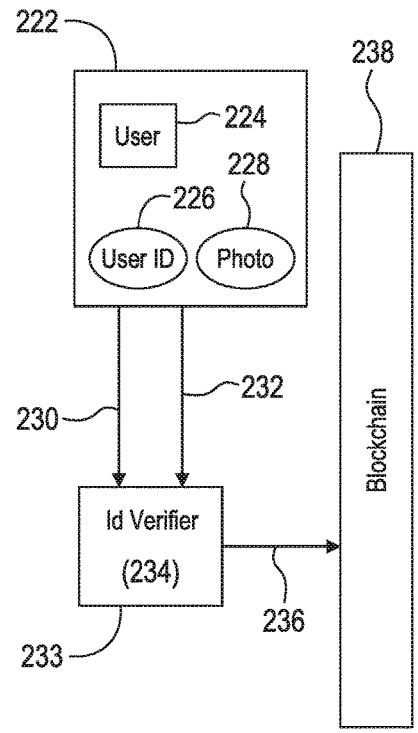
FIG. 2A
FIG. 2B

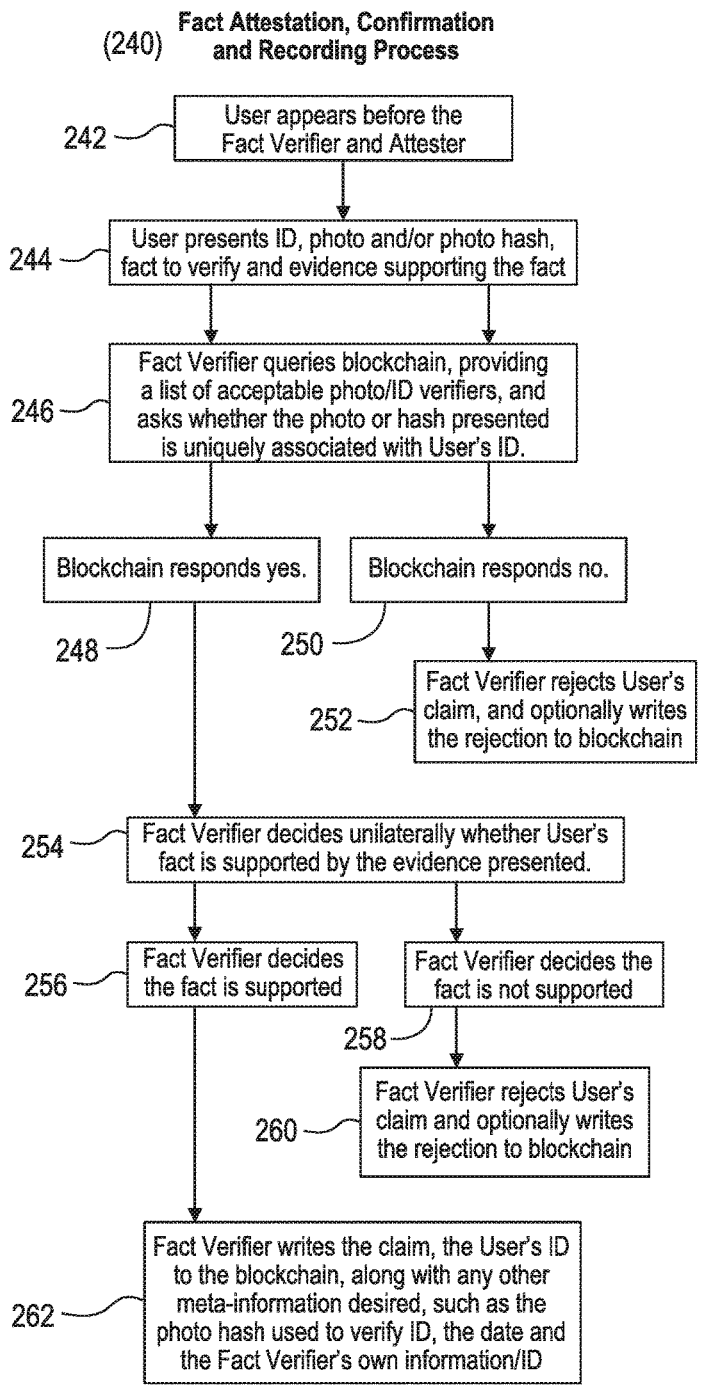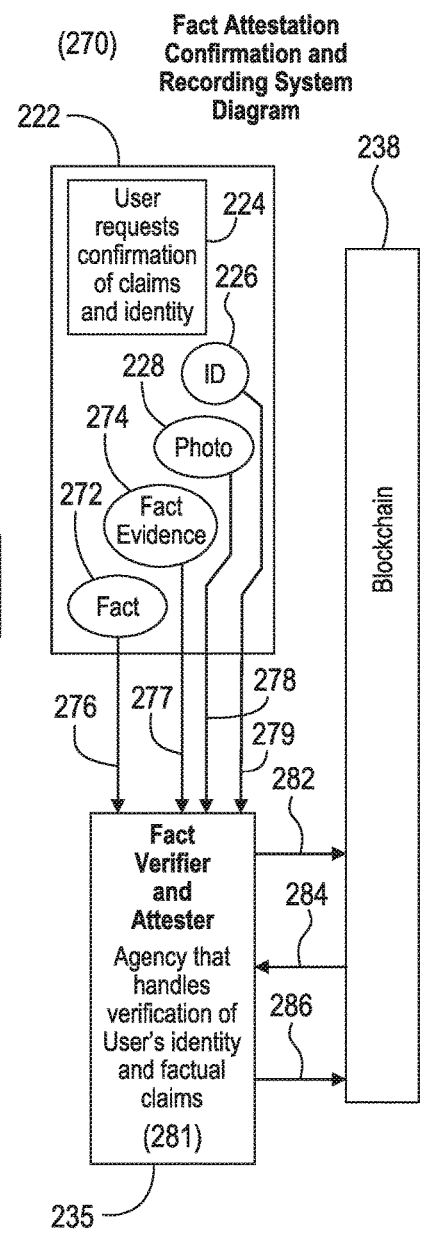
FIG. 2C
FIG. 2D

SYSTEM AND METHOD OF EXECUTING OPERATIONS IN A SOCIAL NETWORK APPLICATION

BACKGROUND

The advent of decentralized transaction systems, such as Bitcoin and SmartContracts, has provided the Internet with a reliably secure protocol for recording ownership over digital value known as the block chain. The blockchain is rooted in private keys and signatures that enable users to digitally preserve immutable historical records (blocks) of transactions in a common ledger linked and secured by cryptology. The common ledger structure of the blockchain makes the records easy to write, read, and to verify their accuracy (e.g., via services/agency formed particularly to perform such functions for a user, entity, or computer system), while difficult for a malicious actor to alter the content or order of the records. The block chain is built on the backs of thousands of peered servers and devised to be mathematically impenetrable. As long as a majority of participating peers act in support of the community, one cannot leverage enough computing power to edit records of the past and thus steal value.

SUMMARY

Embodiments of the present invention are directed to improving social network applications based on the power of the blockchain (or other repository of facts as a service). These embodiments secure a user of the social network applications from participation in undesirable operations initiated by other users in the social network application. For example, these embodiments may secure the user from undesired messaging, liking, searching, viewing, and such by particular users in the social network application. These embodiments secure the user by providing a set of verification parameters that a user may use to define rules for participation in operations. For example, the embodiments may provide the verification parameter "age" and a first user may define rules in the user's account profile so that only users over the age of 40 may view or search the user from the social network application. If a second user then attempts to view or search the first user, the social network application will access the defined rule by the first user and determine whether the second user meets the criteria of the defined rule. To do so, the social network application accesses the blockchain to locate attested-to facts of the second user, where the attested-to facts are recorded as immutable historical records transactions by reliable and trusted online attestations services. Using the accessed attested-to facts, the social network application may determine, with trust, whether the second user meets the defined rules of the first user, and securely filter the first user from participation in the viewing or searching by the second user.

Embodiments of the present invention are directed to computer methods, systems, and computer program products for executing operations in a social network application. The computer program products comprise a non-transitory computer-readable storage medium having code instructions stored thereon, the storage medium operatively coupled to a processor to execute the computer method embodiments. The computer methods, systems, and computer program products register users with a social network application communicatively coupled to a repository of facts as a service, wherein the registering includes providing to the social network application user identifiers recorded in the repository of facts. In some embodiments, each of the user identifiers is at least one of: a public key recorded in the repository of facts, or a text identifier associated with one or more public keys. In some embodiments, the repository of facts as a service is a blockchain, and the social network application is a decentralized application of the blockchain, or a centralized application that calls the blockchain.

The computer methods, systems, and computer program product, for each user, configure and store in a repository coupled to the social network application: a set of verification parameters enabled to filter the participation of the respective user identifier in the set of enabled operations. In some embodiments, the user is a person, and the verification parameters include at least one of: network data, verified experience data, medical data, university data, financial data, employment data, and personal data. In other embodiments, the user is an entity, and the verification parameters and the operation parameters include at least one of: financial data, intellectual property data, employee data, location data, and development projects data.

The computer methods, systems, and computer program products initiate, by a querying user, an operation through the social network application. The initiation of the operation: (a) queries the repository of facts to locate attested-to facts specific to: a user identifier of the querying user or the user identifiers of the registered users, and (b) filters participation of at least one user identifier of the user identifier in the operation based on the located attested-to facts meeting the stored verification parameters. In some embodiments, for each user, the computer methods, systems, and computer program products further configure and store in a repository coupled to the social network application: a set of operations enabled to include participation of a respective user identifier. In these embodiments, the computer methods, systems, and computer program products execute the operation for a given user identifier only if determining, by searching the social network repository, that the operation is included in the stored set of enabled operations for the given user identifier.

The computer methods, systems, and computer program products execute the operation in accordance with the filtering. If the operation includes at least one operation parameter, the computer methods, systems, and computer program products return operation results based on the located attested-to facts meeting the at least one operation parameter. In some embodiments, the operation is an action performed based on: the user identifier of the querying user, the at least one user identifier, and a set of network data. In other embodiments, the operation is a listing (i) performed based on: the user identifier of the querying user and the at least one operation parameter, that (ii) returns as the operation results a set of users associated to the at least one operation parameter.

In some example embodiments, the computer methods, systems, and computer program products register a user, by the social network application, by querying facts of the user recorded in the repository of facts; the querying locates the facts based on the recorded user identifier. The computer methods, systems, and computer program products then determine acceptance or rejection of the user's registration based on the queried facts, and record in the repository of facts, the determined acceptance or rejection of the user's registration associated to the recorded user identifier. In some example embodiments, the computer methods, systems, and computer program products compute a trust score of an attested-to fact retrieved from the repository of facts as a service based on factors used in attesting to the fact.

In some example embodiments, the computer methods, systems, and computer program products configure the social network application by selecting, by a privileged owner of a social network application, a set of trusted fact attesters for attesting to facts related to registered users of the social network application. The computer methods, systems, and computer program products then select one or more of the set of trusted fact attesters to locate and attest to facts from the repository of facts for filtering and executing the initiated operation. The computer methods, systems, and computer program products further store the set of trusted fact verifiers in the communicatively coupled repository, and record a subset of the trusted fact verifiers in the repository of facts. In a subset of the example embodiments, the computer methods, systems, and computer program products also select, by the user or the privileged owner of a social network application, a set of available parameters for filtering operations performed in the social network application. The computer methods, systems, and computer program products then store the set of available parameters in a repository, and record a subset of the available parameters in the repository of facts. The computer methods, systems, and computer program products configure each set of verification parameters based on querying the social network repository or the repository of facts to locate parameters of the set of available parameters.

In some embodiments, the computer methods, systems, and computer program products record the facts in a repository of facts by providing by the user: a fact, evidence of the fact, a recorded user identifier, and user identification. The computer methods, systems, and computer program products next query the repository of facts, by a fact attester, to provide a list of valid identification verifiers for the repository of facts, and wherein an identification verifier is selected from the list. The computer methods, systems, and computer program products then request, by the fact attester, the selected identification verifier to determine whether the provided user identification matches the recorded user identification associated to the recorded user identifier in the repository of facts. If the provided user identification and the recorded user identification match, the computer methods, systems, and computer program products attest, by the fact attester, whether the provided fact is supported by the provided evidence. The computer methods, systems, and computer program products record, by the fact attester, the fact and results of the attestation of the fact in the repository of facts associated to the recorded user identifier. In a subset of these embodiments, the computer methods, systems, and computer program products record in the repository of facts at least one of: user identification, date, information related to the fact attester, and information related to the selected identification verifier.

Further, in a subset of these embodiments, the computer methods, systems, and computer program products encrypt the fact, such that only the user associated with the fact is enabled access to the fact from the repository of facts. The computer methods, systems, and computer program products may then query the repository of facts by receiving permission of a user associated with recorded encrypted facts in the repository of facts. Based on the received permission, the computer methods, systems, and computer program products determine whether the recorded encrypted facts meet the stored verification parameters of the social network application using zero-knowledge proofs, such that results of the recorded encrypted facts meeting the stored verification parameters are determined and returned to the social network application without revealing the recorded encrypted facts to the social network application.

In example embodiments, the computer methods, systems, and computer program products record the user identifier and user identification by determining, by an identification verifier, whether the user identification presented by a user matches physical characteristics of the user. If the presented identification and the physical characteristics match, the computer methods, systems, and computer program products sign, by the user, a transaction indicating ownership of a user identifier, and record in the repository of facts, by the identification verifier, the user identifier and the presented user identification associated to the recorded user identifier. In some of the example embodiments, the computer methods, systems, and computer program products record a hash of the presented identification, and wherein the hash is either encrypted or unencrypted. In some of the example embodiments, the user identification and physical characteristics are at least one of: (i) a photo identification and physical appearance of the user, and (ii) a voice identification and voice features of the user. In some of the example embodiments, the computer methods, systems, and computer program products present the user to the verifier in person or through an online application.

In some computer system embodiments, the computer system includes a social network processor implementing a social network application. The social network processor is communicatively coupled to a repository of facts as a service, and configured to register users with the social network application. The registering by the social network processor includes providing to the social network application user identifiers recorded in the repository of facts. The computer system also includes a user interface that enables each user to select and store in a social network repository coupled to the social network application: a set of verification parameters enabled to filter the participation of the respective user identifier in the set of enabled operations. The user interface also enables a querying user to initiate an operation through the social network application. In response to the initiated operation, the social network processor is further configured to implement the social networking application to query the repository of facts to locate attested-to facts specific to: a user identifier of the querying user or the user identifiers of the registered users. The social network processor is also configured to implement the social networking application to filter participation of at least one user identifier in the operation based on the located attested-to facts meeting the stored verification parameters. The social network processor is further configured to execute the operation in accordance with the filtering. If the operation includes at least one operation parameter, the social network application returns operation results based on the located attested-to facts meeting the at least one operation parameter.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2A is a method of verifying and recording user identification in an example embodiment of the present invention.

FIG. 2B is a system for verifying and recording user identification in an example embodiment of the present invention.

FIG. 2C is a method of attesting and recording user facts in an example embodiment of the present invention.

FIG. 2D is a system for attesting and recording user facts in an example embodiment of the present invention.

DETAILED DESCRIPTION

A description of example embodiments follows.

Digital Processing Environment

Figure 1A:
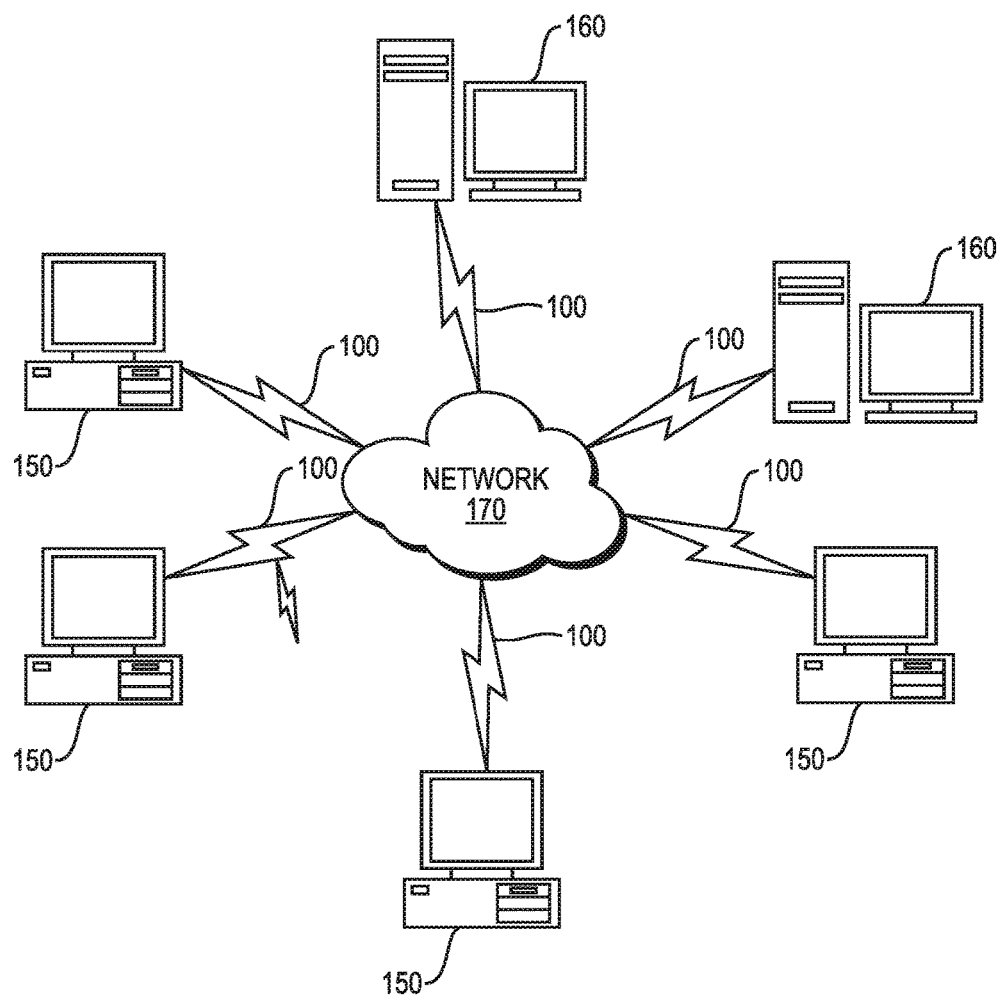
FIG. 1A is an example digital processing environment in which embodiments of the present invention may be implemented.

An example implementation of a social protocol system 100 according to the invention for executing operations in a social network application may be implemented in a software, firmware, or hardware environment. FIG. 1A illustrates one such example digital processing environment in which embodiments of the present invention may be implemented. Client computers/devices 150 and server computers/devices 160 (or a cloud network 170) provide processing, storage, and input/output devices executing application programs and the like.

Client computer(s)/devices 150 are linked through communications network 170 to other computing devices, including other client devices/processes 150 and server computer(s) 160. The cloud 170 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable. For example, client computer(s)/devices 150 may include user device 222 shown in FIGS. 2B, 2D, and 3A, which execute user applications that enable a user to communication with online identification verification services and online fact attestation services, and user applications that enable a user to communication with a social network application (e.g., that enables configuring owner preferences from fact attesters and verification parameters, registering users, configuring filter settings, executing operations, and such).

Server computers 160 of the social protocol system 100 may be configured to include the verification server 233 of FIG. 2B that executes an online identification service 234, which verifies and records identification of the user (such as shown in FIGS. 2A and 2B). Server computers 160 may be configured to further include the attestation server 235 of FIG. 2D that executes an online attestations application 281, which attests and records facts related to the user (as shown in FIGS. 2C and 2D). Server computers 860 may also be configured to include the social network server 310 of FIGS. 3A and 3B that executes social networking application 315, which enables configuring social network owner preferences for fact attesters, registering users, configuring filter settings, executing operations, and such). Server computers 160 may further be configured to include the social network repository 325 of FIGS. 3B and 3C, which includes (i) sub-repository 354 for storing selected owner preferences from fact attesters and verification parameters used in the social network, and (ii) sub-repository 352 for storing user accounts and profiles, including rules based on the selected verification parameters to filter user participation in social network operations. Server computers 160 may also be configured to include a repository of facts as a service, such as the blockchain 238, that an online identification or fact attester service executing on verification/attestation server 235 (FIGS. 2B and 2D) queries and records user identification and attested-to facts, and the social networking application 315 executing on social network server 310 accesses the recorded attested-to facts. Server computers 160 further include a cache/datastore 365 (FIG. 3C) configured for the social network application to cache the attested-to facts retrieved from the repository of facts as a service (e.g., blockchain 238).

In one example embodiment, one or more of the servers 160 are Java application servers. The Java application servers are scalable, such that if there are spikes in network traffic, the servers can handle the increased load. In some embodiments, applications (e.g., social network application, online verification/attestation services) executing on the one or more servers 160 may be implemented via a software embodiment and may operate, at least partially, within a browser session.

Figure 1B:
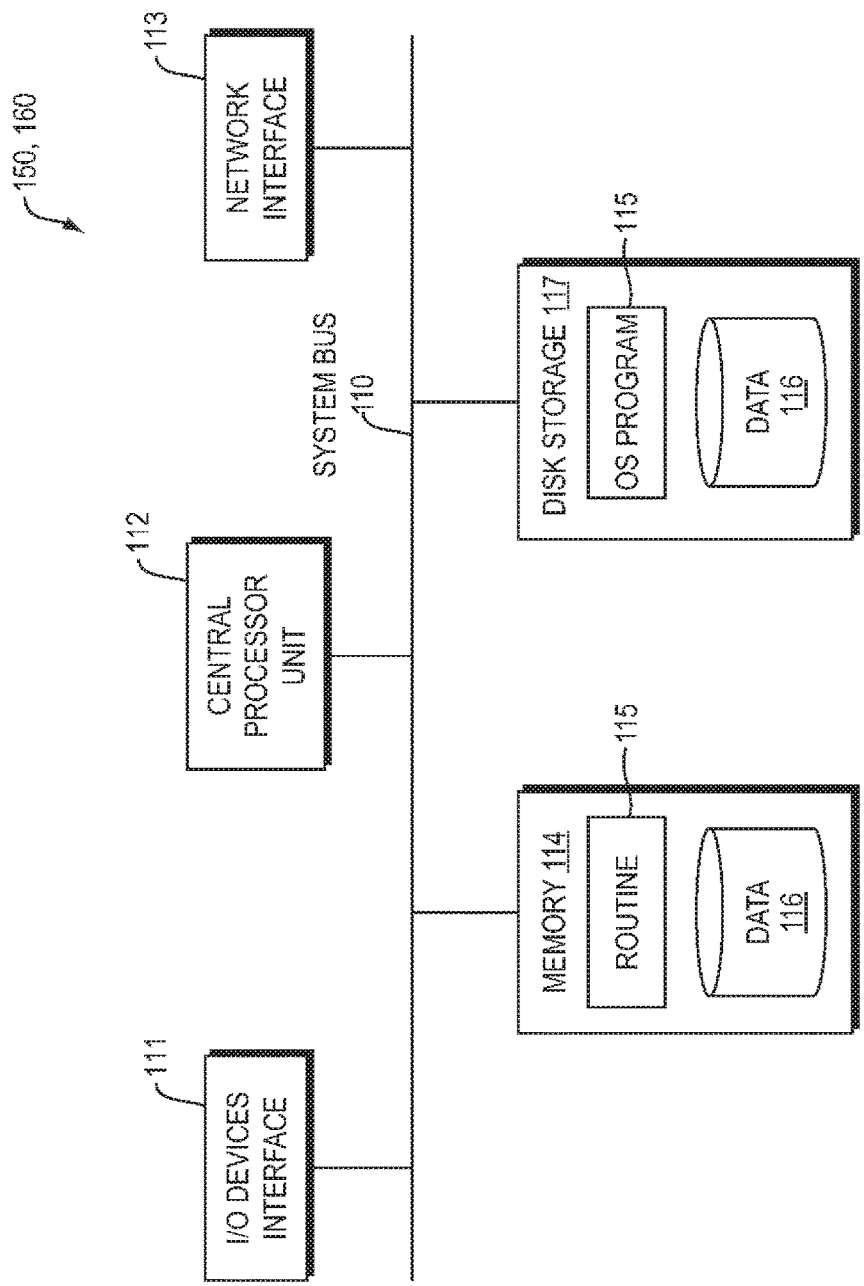
FIG. 1B is a block diagram of any internal structure of a computer/computing node.

FIG. 1B is a block diagram of any internal structure of a computer/computing node (e.g., client processor/device/mobile phone device/tablet/video camera 150 or server computers 160) in the processing environment of FIG. 1A, which may be used to facilitate displaying audio (e.g., voice identification), image (e.g., photo identification), video or data signal information. Embodiments of the invention may include means for displaying audio, image, video or data signal information. Each computer 150, 160 in FIG. 1B contains a system bus 110, where a bus is a set of actual or virtual hardware lines used for data transfer among the components of a computer or processing system. Bus 110 is essentially a shared conduit that connects different elements of a computer system (e.g., processor, disk storage, memory, input/output ports, etc.) that enables the transfer of data between the elements.

Attached to system bus 110 is I/O device interface 111 for connecting various input and output devices (e.g., keyboard, mouse, touch screen interface, displays, printers, speakers, audio inputs and outputs, video inputs and outputs, microphone jacks, etc.) to the computer 150, 160. Network interface 113 allows the computer to connect to various other devices attached to a network (for example the network illustrated at 170 of FIG. 1A). Memory 114 provides volatile storage for computer software instructions 115 and data 116 used to implement software implementations of components of the present inventions (e.g. social protocol system 100 of FIG. 1D).

Software components 114, 115 of the device identification system 100 described herein may be configured using any known programming language, including any high-level, object-oriented programming language. The system 100 may include instances of processes, which enable online verification/attestation services to receive user identification/facts, verify/attest the received user identification/facts, and record the verified identification/attested facts in the blockchain associated to an identifier of the user. The system 100 may include instances of processes, which enable users to configure rules for filtering their participating in social network operation and enable a social network application to execute social network operations based on the configured filtering rules of each user. The social protocol system 100 may also include instances of a trust scoring engine, which can be implemented as a client that communicates to the server 160 through SSL and computes a trust score that provides a measure of confidence that an attested-to fact of a user is actually true based on, for example, evidentiary support provided by the user and other information in the blockchain 238 associated to a user identifier of the user.

In an example mobile implementation, a mobile agent implementation of the invention may be provided. A client-server environment can be used to enable mobile social protocol services using a social network server. It can use, for example, the XMPP protocol to tether a social network agent 115 on the device 150 to a server 160. The server 160 can then issue commands to the mobile device on request. The mobile user interface framework to access certain components of the system 100 may be based on XHP, Javelin, or WURFL. In another example mobile implementation for OS X and iOS operating systems and their respective APIs, Cocoa and Cocoa Touch may be used to implement the client side components 115 using Objective-C or any other high-level programming language that adds Smalltalk-style messaging to the C programming language.

Disk storage 117 provides non-volatile storage for computer software instructions 115 (equivalently "OS program") and data 116 used to implement embodiments of the system 100. Central processor unit 112 is also attached to system bus 110 and provides for the execution of computer instructions.

In one embodiment, the processor routines 115 and data 116 are computer program products, e.g. social network application 315, online verification/attestation services 234, 281, and trust scoring engine (generally referenced 115), including a computer readable medium capable of being stored on a storage device 117, which provides at least a portion of the software instructions for the device identification system 100. Executing instances of respective software components of the device identification system 100, such as instances of social network application, online verification/attestation services, and trust scoring engine may be implemented as computer program products 115, and can be installed by any suitable software installation procedure, as is well known in the art. In another embodiment, at least a portion of the system software instructions 115 may also be downloaded over a cable, communication and/or wireless connection via, for example, a browser SSL session or through an app (whether executed from a mobile or other computing device). In other embodiments, the system 100 software components 115 may be implemented as a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present social protocol system 100.

Figure 1C:
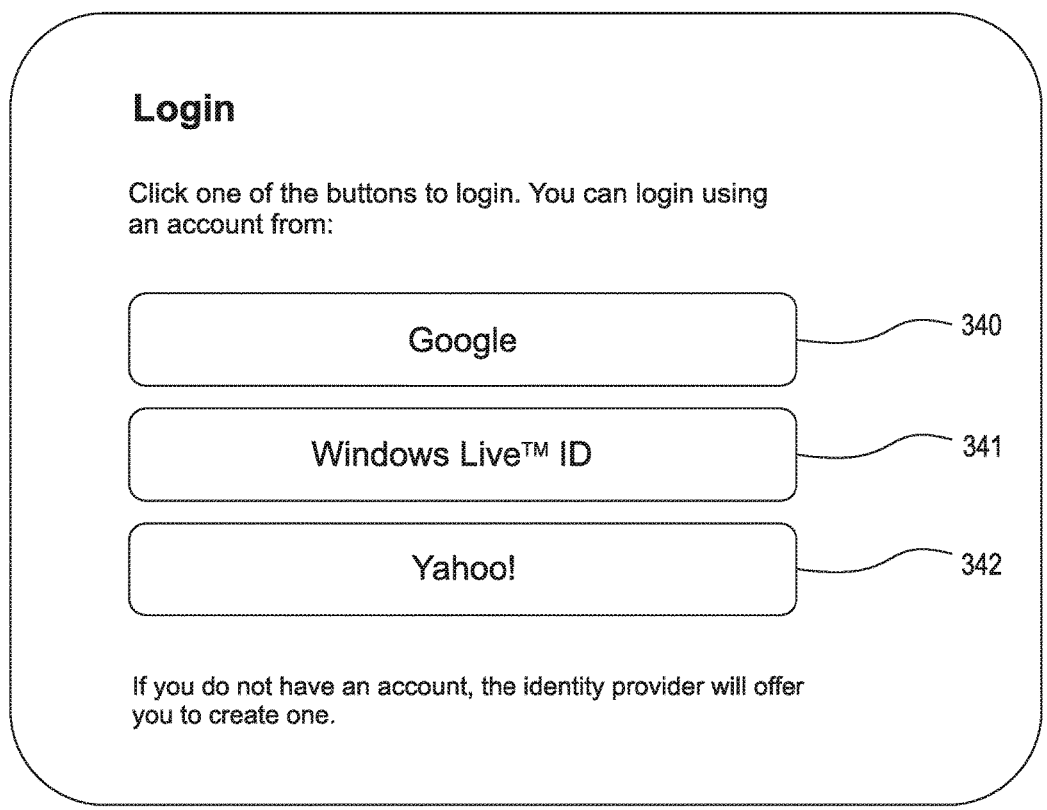
FIG. 1C is an example user interface for log-in to initiate registration of a new or existing social network account in embodiments of the present invention.

FIG. 1C illustrates a sample user interface for log-in to initiate registration of a new or existing social network account of the user with the social protocol system 100. The user selects the particular social network application that the user would like to use to initiate registration of the new/existing account with the social protocol system 100, including Google 40, Windows Live 41, and Yahoo 42, but any other social network application may be included, without limitation (such as LinkedIn, Gmail, Yahoo, Hotmail, Facebook, Twitter, Google, Dropbox, Quora, Pinterest, Vimeo, Netflix, and the like). The registration, configuration, and execution of operations via the particular selected social network application is described in further detail in FIGS. 3A-3C.

Repository of Facts as a Service

The embodiments of FIGS. 2A-3C illustrate using the blockchain 238 to record and access user identification and attested-to facts associated to user identifiers (e.g., public keys or text string identifiers associated with one or more public keys). However, in these and other embodiments, the blockchain may be replaced by any repository of facts as a service. A repository of facts as a service provides an online fact service that, on request, attests to/verifies facts, identification, and the like related to a registered user of the service, and records the attested-to fact, verified identification, and the like in a repository of facts managed by the service. The verifying/attesting may be performed by a verifier/attester of the fact service, which may be a human performing the verifying/attesting using online applications/tools, or an application or program of the fact service virtually performing the verifying/attesting. The verifier/attester records the attested-to facts, verified identification, and the like in the managed repository of facts associated to the identifier of the registered user of the service. The attested-to facts, verified identification, and the like may also be recorded associated to an identifier of the verifier/attester of the fact service. The repository of facts as a service makes available or accessible to the public (individuals and entities) or private entities the recorded attested-to factors or verified authentication, by an individual/entity sending a request to the fact service, and a verifier/attester of the fact service responding to the request by locating and returning the requested attested-to facts, verified identification, and the like (from the managed repository of facts) to the requesting individual/entity. In some embodiments, the individuals and entity may have direct access to search and locate attested-to facts, verified identification, and the like associated with a specified user identifier in the managed repository of facts.

Method of Verifying and Recording User Identification

FIG. 2A is a method 200 of verifying and recording identification of a user in an example embodiment of the present invention. The method 200 begins at step 202 with a user appearing before an identification verifier. In some embodiments, the identification verifier is an application or program of an online or other automated identification service (i.e., a virtual identification verifier), which automatically verifies the user's identity without human intervention. In other embodiments, the identification verifier is a human (for example, employed at an identification agency), who may use automated tools/applications for verifying the identity of the user. In some embodiments, the user appears online to the identification verifier (e.g., the user communicates through a user service application on a user device to the online identification service, and a virtual or human identification verifier of the online identification service performs the verification). In other embodiments, the user appears in person to the identification verifier (e.g., physically appears to a human identification verifier at a physical location).

At method 200, step 204, the user presents a form of user identification to the identification verifier. The user may present the user identification through the user service application executing on the user device to the identification verifier (virtual or human), or the user may physically present the user identification in person to the human identification verifier. In method 200, the presented user identification is any form of photo identification (e.g., license, passport, credit card with photo, identification card, and the like), however, in other embodiments the presented user identification may be voice identification, handwriting identification, and any other type of user identification without limitation. The identification verifier then determines/decides whether the user identification presented in step 204 matches physical characteristics of the user. For example, in the case of the presented photo identification, a human identification verifier may decide through visual inspection whether the photo matches the facial characteristics of the user through in person or online appearance of the user in step 202. For a further example, a virtual identification verifier of an online service may make the determination by digitally or biometrically comparing the photo identification to the physical characteristics (facial characteristics) of the user as appearing to the identification verifier through the online identification service.

At method 200, step 208, the identification verifier determines that the photo identification does not match the physical characteristics of the user, and at step 210 stops method 200 and rejects the verification of the user. At method 200, step 206, the identification verifier instead determines that the photo identification does match the physical characteristics of the user and proceeds with steps of recording the user identification in a public blockchain. Note in FIG. 2A, the method 200 records the user identification in a public blockchain, but in other embodiments the identification verifier may record the user identification in a private blockchain or any other repository of facts as a service without limitation.

To record the verification, at method 200, step 212, the user signs a transaction for a unique public key on the blockchain, thereby verifying that the user owns the unique public key, as well as any unique text string identifier associated with the public key. At method 200, step 216, if the identification verifier determines that the user cannot sign for the public key (e.g., cannot provide proper authentication, such as the private key, related to the public key), then, at step 218, the identification verifier stops the method 200 and rejects the verification of the user. The user may proceed back to step 212, and attempt to complete verification with a different public key. At method 200, step 214, if the identification verifier instead determines that the user can sign for key (e.g., can provide proper authentication related to the public key), then, the identification verifier proceeds to record the presented user identification. Note, in some embodiments, the identification verifier performs the steps of verifying the user's public key and any associated text string identifier (steps 212-218) prior to performing the steps of verifying the user identification (steps 202-210).

At method, step 219, the identification verifier records (writes) the user's public key, or an associated text string identifier, to the public blockchain. At step 219, the identification verifier also records the user identification (e.g., photo identification), or a calculated cryptographic hash of the user identification, to the same chain in the blockchain, thereby associating the user identification (or calculated cryptographic hash of the user identification) to the user's public key (or associated text string identifier) in the blockchain. In some embodiments, the identification verifier records the user identification (or calculated cryptographic hash of the user identification) encrypted in the blockchain, and in other embodiments, the identification verifier records the user identification (or calculated cryptographic hash of the user identification) unencrypted in the blockchain.

System that Verifies and Records User Identification

FIG. 2B is a system 220 that verifies and records user identification in an example embodiment of the present invention. In some embodiments, the system 220 executes the method 200 of FIG. 2A to verify and record the user identification. The system 220 includes a device 222 (e.g., mobile device, personal computer, tablet, or the like) of a user 224, which executes a user service application that enables the user 224 to communicate with an online identification service 234 executing on a verification server 333. The user 224 possesses a unique user identifier 226 (e.g., a unique public key of the blockchain, or unique text string identifier associated with one or more public keys), and a form of photo identification 228 acceptable to an identification verifier (virtual or human) of the online identification service 234 executing on the verification server 233.

The user 224, through communication connection 230 between the user device 222 (via the user service application) and the verification server 233 (via the online identification service 234), appears (e.g., as an image, video, voice, or the like) to an identification verifier of the online identification service 234. The user 224, through communication connection 232 between the user device 222 (via the user service application) and the verification server 233 (via the online identification service 234), digitally signs an authorized transaction proving that the user 224 owns the user identifier 226. The user 224, through the communication connection 232, further transmits the user's photo identification 228 to the identification verifier of the online identification service 234. The identification verifier of the online identification service 234 verifies that the user's transmitted photo identification 228 received via communications connection 232 is valid and matches the user appearance received through the communication connection 230. The identification verifier, through communication connection 236 between the verification server 233 (via online identification service 234) and the blockchain 238, records the photo identification 228 (or hash of the photo identification 228) associated to the unique user identifier 226 in the public blockchain. The photo identification 228 (or hash of the photo identification 228) may be recorded to the blockchain 238 encrypted or unencrypted, based on preferences configured by the user or the identification user.

In some embodiments, the blockchain 238 is replaced by any other repository of facts as a service. In these embodiments, the identification verifier of the online identification service 234 records the photo identification 228 (through communication connection 236) with a repository managed by the repository of facts as a service.

Method of Attesting and Recording User Facts

FIG. 2C is a method 240 of attesting and recording attested-to facts of a user in an example embodiment of the present invention. The method 240 begins at step 242 with a user appearing before a fact attester. In some embodiments, the fact attester (verifier) is an application or program of an online or other automated attestation service (i.e., a virtual fact attester), which automatically attests to facts provided by the user without human intervention. In other embodiments, the fact attester is a human (for example, employed at an attestation agency), who may use an automated application for attesting to the provided facts of the user. In some embodiments, the user appears online to the fact attester (e.g., the user communicates through a user service application on a user device to the online attestation service, and a virtual or human fact attester of the online attestation service performs the attestation). In other embodiments, the user appears in person to the fact attester (e.g., physically appears to a human fact attester at a physical location). In some embodiments, the fact attester is the same human or application/program as the identification verifier of method 200 (FIG. 2A).

At method 240, step 244, the user provides to the fact attester: a user identifier (e.g., public key or text string associated with the public key), photo identification (or cryptographic hash of the photo identification), a claimed fact related to the user, and evidentiary support of the claimed fact. The claimed fact may or may not be true, and the evidentiary support may or may not be sufficient to confirm the claimed fact. In some embodiments, the user provides other forms of identification (instead of photo identification), such as voice identification, handwriting identification, and any other type of user identification without limitation.

At method 240, step 246, the fact attester queries the blockchain (or any other repository of facts as a service), providing in the query a list of photo identification verifiers acceptable to the online attestation service, and requests determination that the provided photo identification matches a recorded photo identification associated with the provided user identifier in the blockchain. The photo identification may or may not be the same photo identification recorded in the blockchain in method 200 of FIG. 2A. An application of the blockchain selects a photo identification verifier of the list of acceptable photo identification verifiers, and requests the selected photo identification verifier to determine whether the provided photo identification (or cryptographic hash of the photo identification) is associated in the blockchain to the provided user identifier.

At method 240, step 250, if the blockchain responds "no" to the matching (i.e., the selected identification verifier determines that the provided photo identification and the recorded photo identification do not match), then, at step 252, the fact attester rejects the user's claimed fact, and optionally records the rejection in the blockchain associated to the provided user identifier. At method 240, step 248, if the blockchain instead responds "yes" to the matching (i.e., the selected identification verifier determines that the provided photo identification and the recorded photo identification do match), then, at step 254, the fact attester unilaterally determines whether the claimed fact is supported by the provided evidentiary support (e.g., based on access to data sources, proprietary or open algorithms, and such).

At method 240, step 258, if the fact attester determines that the claimed fact is not supported by the provided evidence, at step 260, the fact verifier rejects the claimed fact and optionally records the rejection in the blockchain associated to the provided user identifier. At method 240, step 256, if the fact attester instead determines that the claimed fact is supported by the provided evidence, the fact attester records the claimed fact to the blockchain. At method 240, step 262, the fact attester records the claimed fact (now attested-to fact) in the blockchain associated to any other meta-data information, such as the verified photo identification (or cryptographic hash of the verified photo identification), the date, information related to the fact attester (e.g., fact attester's user identifier), and information related to the selected photo identification verifier (e.g., photo identification verifier's user identifier). In some embodiments, the fact attester records the attested-to fact encrypted (e.g., encrypts the attested-to fact with a security key private to the user associated with the fact), such that only the user associated with the fact is enabled access to the fact from the blockchain (or any of repository of facts as a service).

System that Attests and Records User Facts

FIG. 2D is a system that attests and records facts of the user in an example embodiment of the present invention. In some embodiments, the system 270 executes the method 240 of FIG. 2C to attest at least one fact of the user and record the attested-to facts. The system 220 includes a device 222 (e.g., mobile device, personal computer, tablet, or the like) of a user 224 executing a user service application, from which the user 224 communicates with an online attestation service 281 executing on an attestation server 235. The user 224 possesses a unique user identifier 226 (e.g., a unique public key of the blockchain, or text string identifier associated with one or more public keys), and a form of photo identification 228 of the user 224 (or cryptographic hash of the photo identification 228). The user 224 also possesses a claimed fact 272 (which may or may not be true) that the user 224 would like confirmed and recorded in the blockchain. The user 224 further possesses evidence 274 supporting the claimed fact 272 (which may or may not be reliable or be sufficient to support the claimed fact 272).

The user 224, through communication connection 276 between the user device 222 (via the user service application) and the attestation server 235 (via the online attestation service 281), transmits the claimed fact 272 to a fact attester (virtual or human) of the online or otherwise automated attestation service 281. The fact attester of the online attestation service 281 performs the function of attesting (verifying) and recording the user's identity and factual claims at the blockchain 238. The user 224, through communication connection 277 between the user device 222 (via the user service application) and the attestation server 235 (via the online attestation service 281), transmits the evidentiary support 274 to the fact attester of the online attestation service 281. The user 224, through communication connection 278 between the user device 222 (via the user service application) and the attestation server 235 (via online attestation service 281), also transmits the user's photo identification 228 to the fact attester of the online attestation service 281. The user 224, through communication connection 279 between the user device 222 (via the user service application) and the attestation server 235 (via online attestation service 281), further digitally signs an authorized transaction proving that the user 224 owns the user identifier 226 recorded in the blockchain 238.

The fact attester 281, through communication connection 282 between the attestation server 235 (via online attestation service 281) and the blockchain 238, queries the blockchain 238, including providing a list of photo identification verifiers acceptable to the online attestation service 281, and requests determination that the received photo identification 228 matches the received user identifier 226 recorded in the blockchain 238. An application of the blockchain 238 selects one of the acceptable photo identification verifiers, and the selected photo identification verifier determines whether the photo identification 228 (or cryptographic hash of the photo identification 228) is associated in the blockchain 238 to the provided user identifier 226. Note the selected photo identification verifier may be from the online identification service 234 of FIG. 2B (or from a different online or otherwise automated identification service). The blockchain 238, through communication connection 284 between the attestation server 235 (via online attestation service 281) and the blockchain 238, responds in the affirmative or negative to the fact attester of the online attestation service 281 based on the determination made by the selected photo identification verifier.

If the response is affirmative, the fact attester of the online attestation service 281 evaluates the claimed facts 272 and evidentiary support 274 (e.g., using proprietary or open algorithms, data sources, and the like). The fact attester 281, through communication connection 286 between the attestation server 235 (via online attestation service 281) and the blockchain 238, records the results of the evaluation, if positive, to the blockchain 238 associated to the user identifier 226, including the now attested-to fact 272. The fact attester 281 may also optionally record the results of the evaluation, if negative, to the blockchain 238, including indication of the rejection. In the recording of the results, the fact attester of the online attestation application 281 may include the fact, the date, the photo identification 228 (or hash of the photo identification 228), user identifier of the fact attester, and user identifier of the selected photo identification verifier. In some embodiments, the fact attester of the online fact attestation service 281 records the fact encrypted (e.g., encrypts the attested-to fact with a security key private to the user associated with the fact), such that only the user associated with the fact is enabled access to the fact from the blockchain 238.

In some embodiments, the online attestation service 281 is a repository of facts as a service, and the blockchain 238 is replaced by a repository of facts managed (via attestation applications) by the online or otherwise automated attestation service 281. In these embodiments, the online attestation service 281 attests and records the attested-to fact 272 (through communication connections 282, 284, 286 to a repository of facts 238 managed by the online attestation service 281.

System/Method for Registering User in Social Network

Figure 3A:
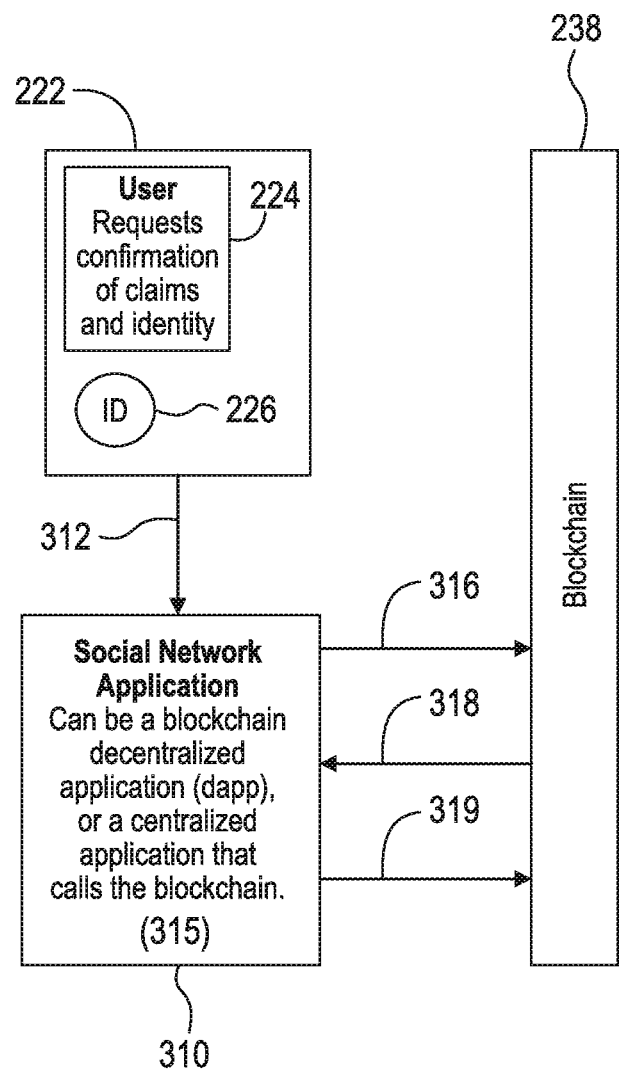
FIG. 3A is a system for registering a user with a social network application in an example embodiment of the present invention.

FIG. 3A is a system 300 that performs a method of registering a user in a social network application in an example embodiment of the present invention. Prior to the execution of system 300 of FIG. 3A, the photo identification 228 of the user 224 has been verified and recorded to the blockchain 238 (or other repository of facts as a service) as described in FIGS. 2A and 2B. In addition, prior to the execution of system/method 300 of FIG. 3A, a claimed fact 272 related to the user 224 has been attested-to and recorded in the blockchain 238 (or other repository of facts as a service) as described in FIGS. 2C and 2D. The system 300 includes a device 222 (e.g., mobile device, personal computer, tablet, and the like) of a user 224, from which the user 224 (via a user registration application) communicates with the social network application 315 executing on a social network server 310. The social network application 315 is implemented by a social network processor 380 shown in FIG. 3C and includes functions for registering a user to the social network application 315. The social network application 315 can be a blockchain decentralized application (dapp), or a centralized application that calls the blockchain 238 (or other repository of facts as a service). The user 224 possesses a unique user identifier 226 (e.g., a unique public key of the blockchain 238, or unique text string identifier associated with at least one public key) recorded in the blockchain 238. The user's photo identification 228 and attested-to fact 272 are recorded in the blockchain 238 associated to the unique user identifier 226.

The user 224, through communication connection 312 between the user device 222 (via the user registration application) and the social network server 310 (via the social network application), transmits the user identifier 226 to the social network application 315. In some embodiments, the social network application 315 may complete the user registration by storing the user identifier 226 and other information related to the user 224 in memory communicatively coupled to the social network server 310, such as at social network repository 325 of FIG. 3B (in sub-repository 352 of FIG. 3C), without performing any verification on the user identifier 226. In the embodiment of FIG. 3A, the social network application 315 instead performs verification on the user identifier 226 in order to complete registration of the user 224.

In this embodiment, the social network application 315, through communication connection 316 between the social network server 310 (via the social network application 315) and the blockchain 238, requests data (attested-to fact 272) of the user 224 to be retrieved from the blockchain 238. In response to the request, an online attestation service communicatively coupled with the blockchain 238, such as the online attestation service 281 of FIG. 2D, assigns a fact attester 281 to retrieve attested-to facts 272 from the blockchain 238, and the fact attester queries the blockchain 238 (using the user identifier 226) to locate the attested-to fact 272 associated to the user identifier 226. Other attested-to facts may also be recorded in the blockchain associated to the user identifier 226, which are also located by the fact attester querying the blockchain 238. The online attestation service responds to the request, through communication connection 318 between the social network server 310 (via the social network application 315) and the blockchain 238, by returning the located attested-to fact 272 (and other attested-to facts located in the blockchain 238 associated to the user identifier 226), or by returning an indication that no attested-to facts are associated to the user identifier 226 in the blockchain 238.

If the online attestation service communicatively coupled to the blockchain 238 returns an attested-to fact 272, the social network application 315 may record the attested-to fact 272 associated to the user identifier 226 in memory (e.g., a social network repository 325 of FIG. 3B in sub-repository 352 of FIG. 3C) communicatively coupled to the social network server 310. Based on the returned attested-to fact 272, the social network application 315 may further accept the registration of the user 224 to the social network application 315 and record the acceptance associated to the user identifier 226 in the memory (e.g., sub-repository 352 of FIG. 3C). If the application communicatively coupled with the blockchain 238 instead returns an indication that no attested-to facts are associated to the user identifier 226 in the blockchain 238, the social network application 315 may instead reject the registration of the user 222 to the social network application 315, and optionally record the rejection associated to the user identifier 226 in the memory (e.g., sub-repository 352 of FIG. 3C).

The social network application 315, through communication connection 319 between the social network server 310 (via the social network application 315) and the blockchain 238, may further transmit the acceptance or rejection of the user's registration to the blockchain 238, and the online attestation service communicatively coupled to the blockchain 238 records the acceptance/rejection in the blockchain 238 associated to the user identifier 226.

System/Method for Selecting Services and Parameterization in Social Network

Figure 3B:
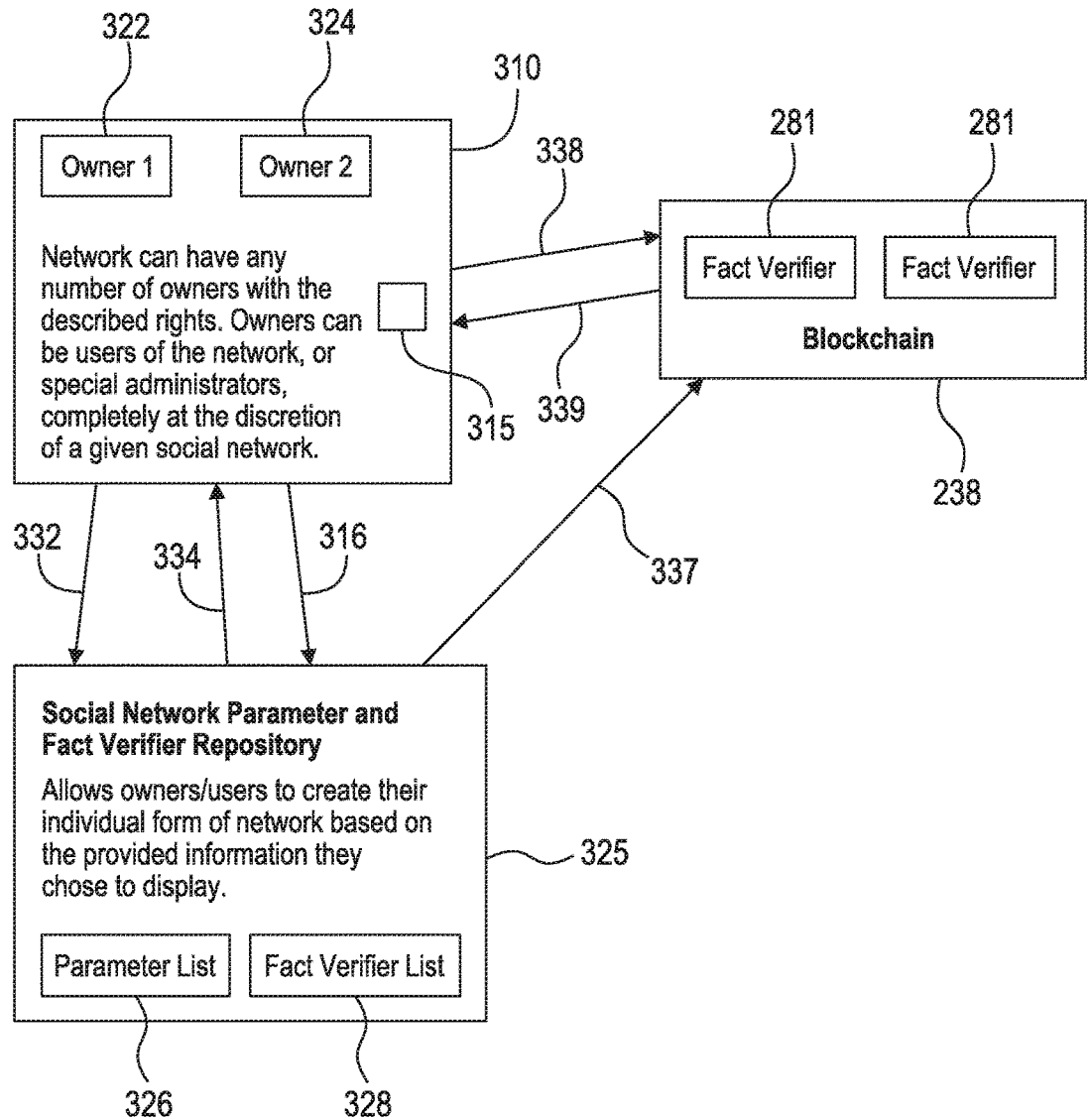
FIG. 3B is a system for selecting data sources and live parameterization in an example embodiment of the present invention.

FIG. 3B is a system 320 that performs a method of selecting verification data sources and live parameterization for a social network application 315 in an example embodiment of the present invention. FIG. 3B illustrates owners (Owner 1 322 and Owner 2 324) of the social network application 315 executing on the social network server 310. In embodiments, the social network application 315 may have any number of owners, such as users or special administrators of the social network application 315, that are given privileges/rights to select third-party service/data providers (e.g., fact attesters, authentication verifiers, and such) used by the social network application 315, and verification parameters for filtering data (live parameterization) in the social network application 315. The owners (Owner 1 322 and Owner 2 324) may be programs or processes executing in the social network application 315 (virtual owners) or humans or entities connected to the social network application 315.

The social network application 315 executing on the social network server 310 is communicatively coupled to a social network repository (i.e., social network parameter and fact verifier repository) 325, which stores information for the social network application 315. The social network repository 325 may include sub-repositories (parameter and fact verifier repository 354 and registered user repository 352 of FIG. 3C). The stored information in the social network repository 325 (sub-repository 354) includes third-party service/data providers selected by the owners 322, 324 of the social network application 315, including fact attesters/verifiers and lists/sets 328, that the owners 322, 324 currently consider reliable for accessing data (attested-to facts) related to registered users of the social network application 315. The stored information in the social network repository 325 (sub-repository 354) further includes verification parameter lists/sets 326 (e.g., verification fact classes) selected by the owners 322, 324 for filtering data (live parameterization) in the social network application 315. The verification parameters may include categories of data related to a human/person registered user, such as network data, verified experience data (e.g., hotels stayed, flights taken, travel locations, and the like), medical data, university data, financial data (e.g., wealth, investments, income, and the like), employment data (e.g., employment history and the like), and personal data (e.g., weight, age, and the like). The verification parameters may also include categories of data related to an entity/corporation registered user, such as financial data, intellectual property data, employee data, location data, and development projects data.

Figure 3C:
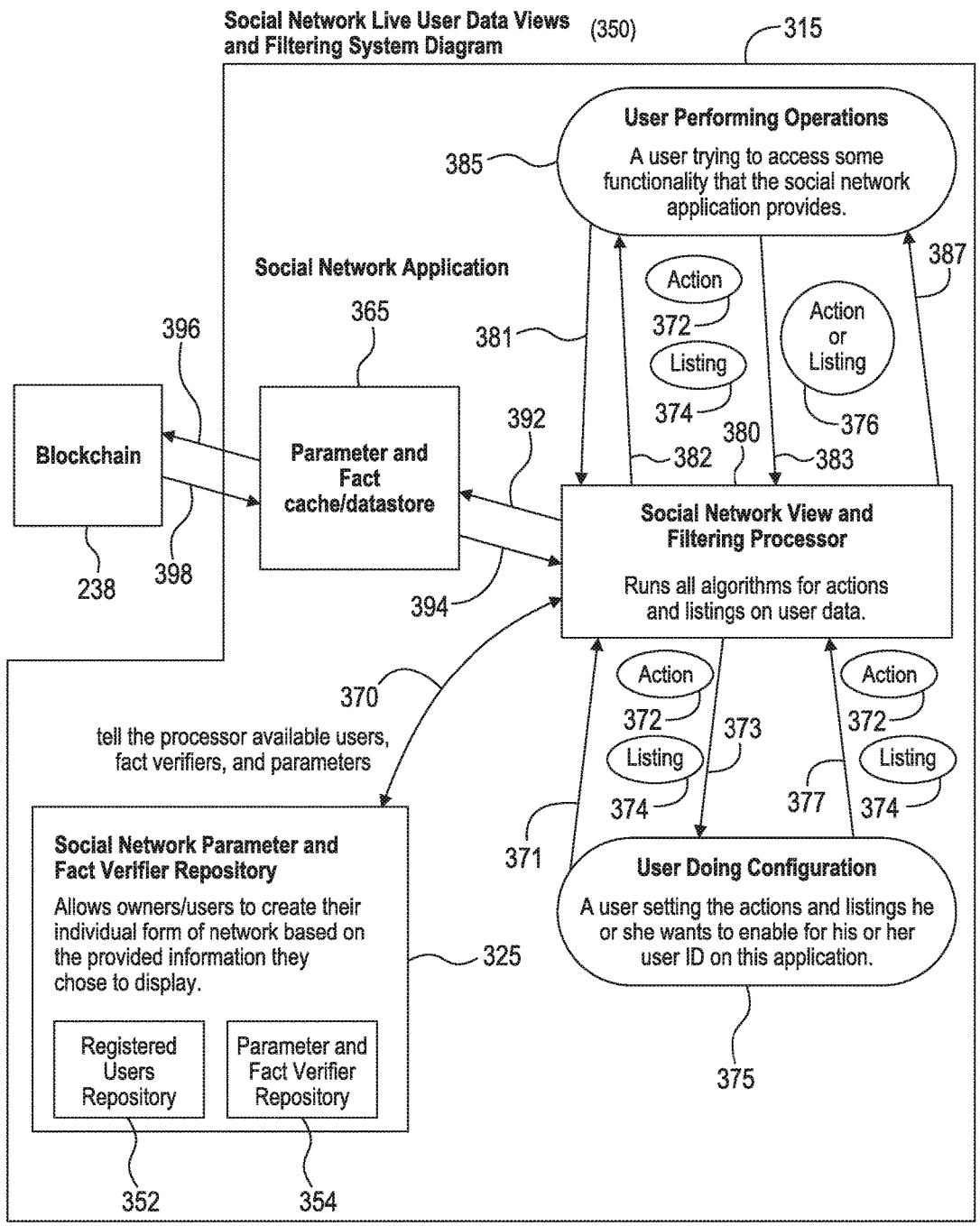
FIG. 3C is a system for viewing, filtering, and executing operations in an example embodiment of the present invention.

For the social network application 315 (via owners 322 and 324) to decide on fact attesters for the fact attester list 328 and verification parameters for the verification parameter lists/sets 326, the social network application 315, through communication connection 332 between the social network server 310 (via social network application 315) and the social network repository 325, requests current fact attesters and verification parameters stored in the social network repository 325 (sub-repository 354 of FIG. 3C). The social network repository 325, through communication connection 334 between the social network server 310 (via social network application 315) and the social network repository 325, responds with the fact attesters from the fact attester list 328 and the verification parameters from the verification parameters list 326. The social network application 315 (via Owner 1 322 and Owner 324) updates the fact attester list 328 and verification parameters list 326 based on current conditions.

The social network application 315 (via owners 322 and 324), through communication connection 338 between the social network server 310 (via social network application 315) and the blockchain 238, queries the blockchain 238 (or any other repository of facts as a service) for information regarding current reliable fact attesters of the blockchain 238 (which may include the same or alternative fact attesters as stored in fact attester list 328). The blockchain 238, through communication connection 339 between the social network server 310 (via social network application 315) and the blockchain 238, responds with information related to various fact attesters from online services/agencies, such as the online attestation service 281 executing on the attestation server 235 of FIG. 2D, that perform transactions in the blockchain 238. Based on decision procedures of the social network, the social network application 315 (via owners 322 and 324) reviews the information and determines a new list/set of reliable fact attesters for accessing attested-to facts related to registered users of the social network application 315. Based on decision procedures of the social network, the social network application 315 (via owners 322 and 324) also determines a new list/set of verification parameters for filtering data in the social network application 315.

The social network application 315, through communication connection 336 between the social network server 310 (via social network application 315) and the social network repository 325, updates the social network repository 325 (sub-repository 354) with the new list/set of determined fact attesters (as fact attester list 328) and the new list/set of verification parameters (as verification parameter list 326). The social network application 315 may also record the new lists/sets of determined fact attesters and verification parameters in the blockchain 238 associated to an identifier for the social network application 315 (via communication connection 337).

A user 224 registered with the social network application 315, such as by the registration method 300 of FIG. 3A, may configure the user's account or profile in the social network application 315 according to verification parameters in the verification parameter list 326 in the social network repository 325. For example, the user 224 via user device 222 of FIGS. 2B and 2D, through a communication connection with the social network application 315 executing on the social network server 310, may request the verification parameter list 326 from the social network repository 325. The user 224 may then, through the communication connection with the social network application 315, define rules using the returned verification parameters of the verification parameter list 326 for filtering other users of the social network application 315 from accessing, searching, viewing, messaging, liking, and the like the user 224 through the social network application 315. That is, the user 224 configures the verification parameters (in the defined rules) to enable the social network application 315 to filter the participation of the user identifier 226 of the user 224 from executed operations by other registered users. For example, the user 224 may define rules that only enable other registered users with a net worth over $1 million dollars to perform a message operation using the user identifier 226 of the user 224. The social network application 326 may store the user's account or profile with the defined rules in the social network repository 325 (sub-repository 352). In this way, a user 224 may define an individual configuration (form) of the social network application 315 defining how other registered users are allowed to view and communicate with the user through the social network application 315.

System/Method for Executing Operations in Social Network

FIG. 3C is a system 350 that performs a method that executes operations in a social network application in an example embodiment of the present invention. The system 350 includes the social network repository 325 of FIG. 3B, which contains two sub-repositories. The first sub-repository is the verification parameter and fact attester/verifier repository 354, which is populated with the verification parameter lists 326 and fact attester lists 328 determined by the social networking application 315 (via owners 322 and 324) in FIG. 3B. The verification parameter and fact attester/verifier repository 354 may also include operations determined by the social network application 315 (via owners 322 and 324) to be available for execution by a user. The second sub-repository is the registered user repository 352, which is populated with registered users' accounts or profiles configured with the defined rules (using the list/set of verification parameters 326 from repository 354) for filtering other registered users of the social network application 315 from accessing, searching, viewing, messaging, liking, and the like a given registered user (e.g., user 224) through the social network application 315.

The system 350 also includes a social network processor (i.e., view and filtering processor) 380 that executes the social network application 315. The social network processor 380 is coupled to a user interface for configuring, viewing, and operating the social network application 315, which may be executed through a user device (e.g., user device 222 of FIG. 3A). The user interface includes user configuration interface 375, which allows a user 224 to set (i) operations enabled for the user's account/profile and (ii) filtering of participation of the user identifier 226 from operations as described in FIG. 3B. The user interface also includes user operation interface 385 (which enables the user to perform operations/access functionality provided by the social network application).

In FIG. 3C, a user (user 224 of FIG. 3A), through the user configuration interface 375, configures/sets operations (at least one of actions 372 and listings 374) to be enabled for the user identifier 226 of the user 224 in the social networking application 315. An action operation 372 is an operation that takes a user identifier, a list of one or more user identifiers of other registered users, a task to perform by the operation (e.g., message multiple other users, like a posting of one other user, and such), and a set of network data used to perform the operation, and the social network processor 380 executes the action operation 372 using the set of network data. An example of an action operation may be "user id 224 send message to user ids 206 207." Another example of an action operation may be "user id 224 likes photo of user id 206 located at hash 985." A listing operation 374 is an operation that takes a user identifier and a set of operation parameters, and the social network processor 380 executes the listing operation 374 to return a list of users that the social network application 315 associates with the parameters, according to algorithms of the social network application 315. An example of a listing may be "list all users located in Dallas, Tex. and attended Rice University."

The user configuration interface 375, through communication connection 371 between the user configuration interface 375 and the social network processor 380, requests the available operations (actions 372 and listings 374) of the social network application 315. The request may include the user identifier 336 of the user 334, along with any other information required by the social network application 315 to process the operation request. The social network processor 380, through communication connection 370 between the user configuration interface 375 and the social network repository 325, queries the social network repository 325 (sub-repository 354) to access the stored list of operations available through the social network application 315. The social network processor 380, through communication connection 373 between the user configuration interface 375 and the user configuration interface 375, responds to the user configuration interface 375 with the accessed list.

The user 224, through the user configuration interface 375, reviews the list of available operations (including both actions 372 and listings 374), and selects a set of one or more operations from the list of available operations to include participation of the user identifier 226 of the user 224. The selected set of operations may be the full list of available operations or any subset of the list of available operations. The selected set of operations comprise those operations that, when executed by other users, will include the user identifier 226 of the user 224 as a participant in the executed operations. The user interface 375, via a communication connection 377 between the user configuration interface 375 and the social network processor 380, transmits the selected set of operations to the social network processor 380, which enables those operations in the user's account or profile stored in the registered user repository 352 (through communication connection 370). The user's account or profile also includes defined rules (based on the verification parameter list 326 of FIG. 3B stored in sub-repository 354 of FIG. 3C) for filtering participation of the user in executed operations by other users. The defined rules may be rules defined by the user or rules automatically generated by the social network processor 380 (e.g., via an automated script that generates the rules based on analysis of the user's account or profile).

A querying user, via the user operation interface 385 requests, through communication connection 381 between the user operation interface 385 and the social network processor 380, the operations (actions 372 and listings 374) available through the social network application 315. The social network processor 380, via the communication connection 370 between the social network processor 380 and social network repository 325, queries the social network repository 325 (sub-repository 354) to access the stored list of operations available through the social network application 315. The social network processor 380, through communication connection 382 between the social network processor 380 and the user operation interface 385, responds to the user operation interface 385 with a list of operations available through the social network application 315. The querying user, via the user operation interface 385, through communication connection 383 between the user operation interface 385 and the social network processor 380, specifies an operation (action or listing 376) of the list of available operations to be executed by the social networking application 315. The social network processor 380, through the communication connection 370, searches in the social network repository 325 (sub-repository 352) for the accounts/profiles of each user registered with the social network application 315 to determine a list of corresponding user identifiers enabled to participate in the specified operation. The social network processor 380 determines a set of participating user identifiers, including the user identifier 226 of user 224, which can be included in the execution of the specified operation.

In some embodiments, the social network processor 380 is not configured to search for enabled participation of a user in a specified operation. In these embodiments, the determined set of participating user identifiers includes all registered users of the social networking application 315 (without consideration of the specified operation being executed by the querying user).

For each of the determined set of participating user identifiers, the social network processor 380 queries the social network application 325 (sub-repository of registered users 352) to determine the defined set of rules set by the respective user for filtering operations of other registered users in the social network application 315. For example, the social network processor 380 determines the set of rules defined by the user 224 for filtering other users of the social network application 315. For each rule of the set of rules, the social network processor 380, through communication connection 392 between the social network processor 380 and a cache/datastore (i.e., parameter and fact cache/datastore) 365, locates an attested-to fact of the querying user (associated to the user identifier of the querying user) relevant to the one or more verification parameters used to define the rule of the user 224. For example, if the operation executed by the querying user is a messaging operation, and the defined rule user 224 (whose user identifier 226 is included in the determined set of participating user identifiers) indicates that only users with a net worth of over $1 million dollars are allowed to message the user 224, the social network processor 380 queries the cache/datastore 365 to determine an attested-to fact regarding the net worth of the querying user (who is attempting to message the user 224).

If such an attested-to fact of the querying user is not cached in the cache/datastore 365, the cache/datastore, through communication connection 396 between the cache/datastore 365 and the blockchain 238, queries the blockchain 238 (e.g., via a fact attester of an online attestation service recorded in the social network repository 325 by the method of FIG. 3B) to locate such an attested-to fact of the querying user based on the querying user's user identifier.

Note in embodiments, the blockchain 238 may be replaced by any other repository of facts as a service without limitation. The blockchain 238, via a communication connection 398 between the cache/datastore 365 and the blockchain 238, (i) returns such an attested-to fact, which is then cached in the cache/datastore 365 for later queries, or (ii) returns an indication that no such attested-to fact is recorded for the user identifier of the querying user in the blockchain 238. The cache/datastore 365 in turn, through a communication connection 394 between the cache/datastore 365 and the social network processor 380, returns the attested-to fact or indication to the social network processor 380. If the indication of no such attested-to fact is returned by the blockchain 238, the user identifier 226 is filtered by the social network processor 380 from participation in the executed operation specified by the querying user. Further, if the returned attested-to fact of the querying user does not meet a defined rule of user identifier 226, then that user identifier is filtered by the social network processor 380 from participation in the executed operation specified by the querying user. For example, if the returned attested-to fact of the querying user indicates that the net worth of the querying user is only $500,000 (i.e., not over $1 million dollars as required by the defined rule of user 224), user 224 is filtered from participation in the executed operation specified by the querying user. The social network processor 380 similarly determines whether each of the other user identifiers in the determined set of participating user identifiers should be filtered from participation in the executed operation specified by the querying user (based on the defined rules for the respective user identifier).

Similarly, the social network processor 380 may query the social network repository 325 (registered user sub-repository 352) to determine the defined set of rules set by the querying user for filtering operations of other registered users in the social network application 315. The social network processor 380 may then, for each user identifier of the determined set of participating user identifiers (e.g., user identifier 226 of user 224), query the cache/datastore 365 to locate an attested-to fact associated to the respective user identifier and relevant to the one or more verification parameters used to define a rule of the set of rules. The social network processor 380 may perform the querying via the communication connection 392, and the cache/datastore 365 may in turn query the blockchain 238 to locate/cache such attested-to facts. The cache/datastore 365 may in turn query the blockchain 238, through communication connection 396 between the cache/datastore 365 and the blockchain 238, to retrieve the attested-to facts from the blockchain 238 and cache in the cache/datastore 365 for later access. For example, if the executed operation specified by the querying user is a messaging operation, and the defined rule of the querying user indicates that only users over the age of 40 are allowed to be messaged by the querying user, the social network processor 380 queries the cache/datastore 365 to determine, for each user identifier of the determined set of participating user identifiers, an attested-to fact regarding the age of the respective user. If such an attested-to fact is unavailable or indicates that the respective user is not over 40, then the respective user is filtered from participation in the operation executed by the querying user.

The social network processor 380 then executes the specified operation on the determined set of participating user identifiers remaining (i.e., not filtered from participation). If the specified operation is an action operation, the social network processor 380, through communication connection 392 between the social network processor 380 and the user operation interface 385, returns operation results related to each of the remaining user identifiers (not filtered from participation of the operation).

If the operation is a listing operation (e.g., list all users located in Dallas, Tex. and attended Rice University) then the operation may include one or more operation parameters, such as "located in Dallas, Tex." and "attended Rice University." The social network processor 380, for each remaining user identifier of the determined set of participating user identifiers, queries the cache/datastore 365 to locate an attested-to fact associated to the respective user identifier and relevant to the one or more operation parameters included in the specified operation. For example, to locate attested-to facts indicating whether a user associated to remaining user identifier (e.g., user 224 associated to user identifier 226) is "located in Dallas, Tex." and "attended Rice University." The social network processor 380 may query the cache/datastore 365, through communication connection 392 between the social network processor 380 and the cache/datastore 365. The cache/datastore 365 may in turn query the blockchain 238, through communication connection 396 between the cache/datastore 365 and the blockchain 238, to retrieve the attested-to facts from the blockchain 238 and cache the attested-to facts in the cache/datastore 365 for later access.

The social network processor 380, through communication connection 387 between the social network processor 380 and the user operation interface 385, returns operation results that include a user associated to a remaining user identifier, if retrieved attested-to facts for that user identifier meet the one or more operation parameters. For example, if the retrieved attested-to facts 272 (from blockchain 238 or cache/datastore 365) for user identifier 226 indicate that user 224 both is "located in Dallas, Tex." and "attended Rice University" then user 224 meets the operation parameters of the specified operation (and is returned as part of the operating results to the user operation interface 385).

In some embodiments, the online authentication service 234, online attestation service 281, and social network application 315 (social network processor 380) perform steps to verify (anticipate) that a user identifier used to record/access data (e.g., attested-to facts) from the repository of facts as a service (blockchain) is not a false user identifier. For example, the online authentication service 234, online attestation service 281, and social network application 315 (social network processor 380) may verify that the user identifier is not created by performing a centralized, identifier-as-a service version of the blockchain identifier storage aspect. That is, the online services and social network application check that the user identifier (e.g., blockchain public key) is not a simulated identifier created and stored by a centralized service or company as a version of a user's blockchain public key for use in applications/services such as Google or Facebook.

Trust Score

Figure 4:
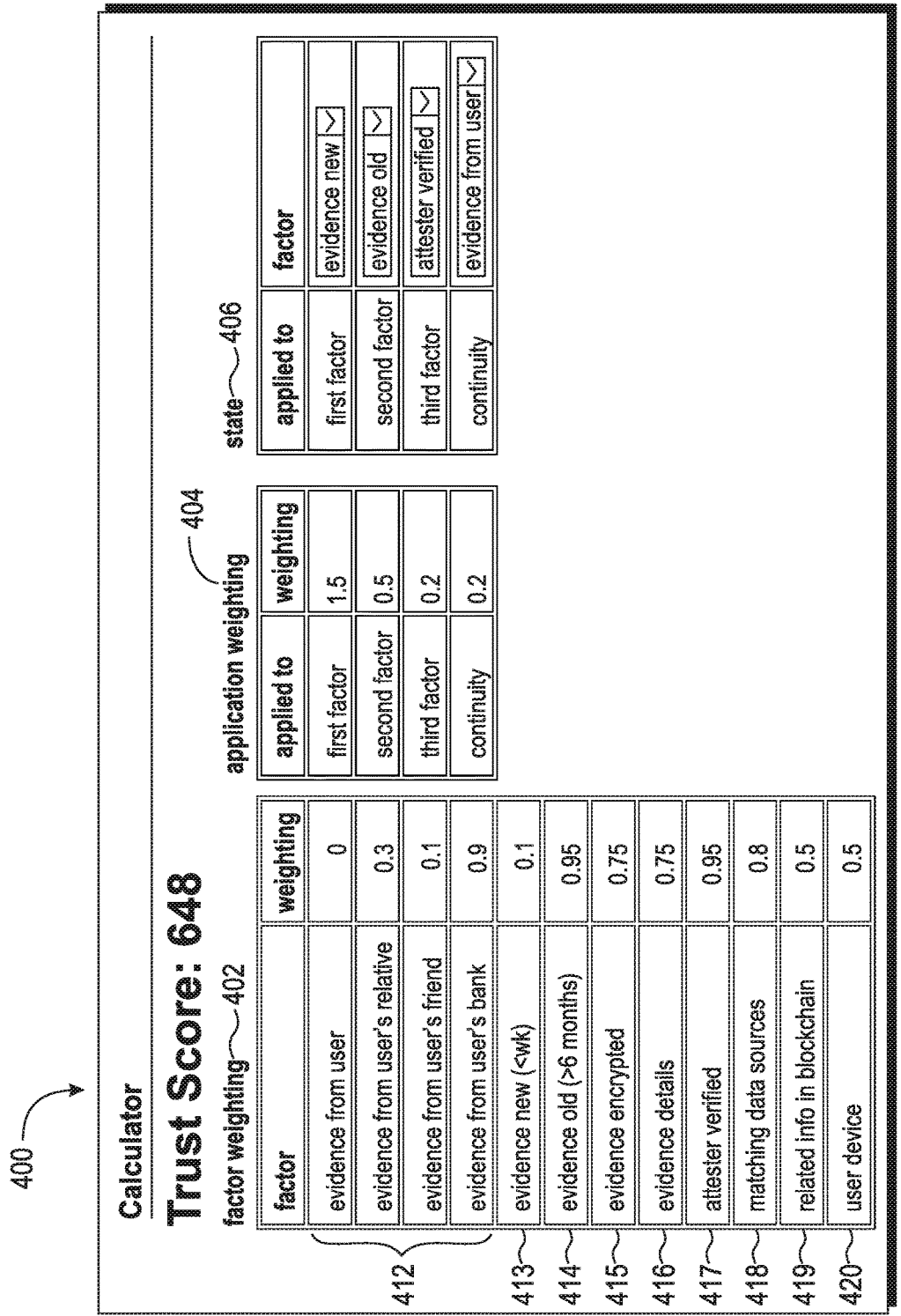
FIG. 4 is an example trust score calculator 400 that computes a trust score of attested-to user facts in embodiments of the present invention.

FIG. 4 illustrates a diagram of a trust score calculator 400 that computes a trust score of attested-to user facts of a user based on one or more configured factors. Preferably, the trust score is calculated based on one or more of tests/factors 402 associated with corresponding assigned weighting, such as the device 420 used by the user to access an online service verification/attestation application 233, 235 or social network application 315, as well as a range of additional attested-to user fact verification factors, such as who provided the evidentiary support 412, the details and complexity 416 of evidentiary support provided by the user, whether the attested-to fact was verified by an official attester 417 of a service/agency or by another source, and whether other related information 419 of the user (user identifier) is recorded in a trusted repository, including a repository of facts as a service (e.g., blockchain), etc.

Weighting tables may be used in embodiments of the computation of a trust score. The trusting score engine may be provided a subset (state) 406 of the factors to use in determining the trust scope for a particular application (e.g., verification/attestation service 233, 235 or social network application 315). Each of the selected factors are assigned a weight 404 based on their ordering in the subset specific to the particular application. A trust scoring engine, executing on the application determines whether the selected factors (e.g., how long ago evidentiary support of a fact was available from a given data source, i.e., evidence new 413 and evidence old 414) is relevant to an attested-to fact, and if relevant, the factor is included in the aggregated total. In some embodiments, instead of assigning ordering of facts by the application, the trust scoring engine may look to the factor with the highest weighting assigned to it, and automatically designate it as the "first factor", while the factor with the next associated highest weighting is automatically designated as the "second factor."

Unitless weighting factors 412 are provided, which may also include, for example, continuity factors, such as whether evidentiary support of the fact is provided by greater than 2 data sources (i.e., matching data sources 418). If, for example, information that validates evidence of a claimed fact is available (and matches) 418 from multiple different sources (e.g., from both the user's Facebook account and the user's Linked In account), this suggests that the claimed fact may be more reliable. Application weightings may be assigned that signify the importance of the respective factors in relation to the overall trust score computation. In this way, while the trust score factors involved in the computation by an official fact attester of service/agency 417 may be of greater significance, additional external tests are also preferably considered in the trust score computation. For example, tests/factors beyond the environment of the service/agency are considered, such as tests by the social network application, other services providers (e.g., banks, universities, doctors, and such), security applications executing on a user's device, etc.

Trust Scoring Analytics

Information related to attested-to user facts verification test/factors used in the calculation of a trust score, including information regarding which tests/factors are successfully applied versus those that were processed but were not successfully applied can be used to improve the quality of the trust scoring engine. For example, an analytics tool (such as a web analytics tool or business intelligence tool) may produce various metrics, such as measures of available evidentiary support of the attested-to facts verification factor/test success and measures of other recorded user information in a trusted source (e.g., in a repository of facts as a service, such as the blockchain) based on the combination of other criteria (e.g. environment variables associated with the device being identified), and filter these results by time of the day or time period or location. Such measures can be viewed per test/factor to help improve the trust scoring engine/agent/tool because the results may be aggregated across a multitude of devices, users, and third party service providers.

An analytics tool offers the possibility of associating other quantitative data beside frequency data with a successful test/factor application. For instance, the results of a high trust score calculation could be joined against the metrics derived by an analytics system (such as a web analytics solution or a business intelligence solution).

Furthermore, analytics data for a calculated trust score for a device can be aggregated per type of user (e.g., person or entity) and type of fact (e.g., financial data, health data, verified experience data, and such). For example, it could be of interest to know which types of tests/factors are most or least conducive to a high trust score calculation, or on the contrary, applied to a low trust score calculation.

While example embodiments have been particularly shown and described, it will be understood by those skilled in the art that various changes in form and details may be made therein without departing from the scope of the embodiments encompassed by the appended claims.

What is claimed is:

1. A computer-implemented method of executing operations in a social network application, the method comprises:
   registering users with a social network application communicatively coupled to a repository of facts as a service, wherein the registering includes providing to the social network application user identifiers recorded in the repository of facts;
   for each user, configuring and storing in a repository coupled to the social network application: a set of verification parameters enabled to filter the participation of the respective user identifier in a set of operations;
   initiating, by a querying user, an operation through the social network application, wherein:

(a) querying the repository of facts to locate attested-to facts specific to: a user identifier of the querying user or the user identifiers of the registered users; and (b) filtering participation of at least one of the user identifiers in the operation based on the located attested-to facts meeting the stored verification parameters; and executing the operation in accordance with the filtering, wherein, if the operation includes at least one operation parameter, returning operation results based on the located attested-to facts meeting the at least one operation parameter.

2. The method of claim 1, wherein:

for each user, further configuring and storing in the repository coupled to the social network application the set of operations enabled to include participation of the respective user identifier; and executing the operation for a given user identifier only if determining, by searching the social network repository, that the operation is included in the stored set of enabled operations for the given user identifier.

3. The method of claim 1, wherein each of the user identifiers is at least one of: a public key recorded in the repository of facts, or a text identifier associated with one or more public keys.

4. The method of claim 1, wherein the repository of facts as a service is a blockchain.

5. The method of claim 4, wherein the social network application is a decentralized application of the blockchain, or a centralized application that calls the blockchain.

6. The method of claim 1, wherein the user is a person, and the verification parameters and the operation parameters include at least one of: network data, verified experience data, medical data, university data, financial data, employment data, and personal data.

7. The method of claim 1, wherein the user is an entity, and the verification parameters and the operation parameters include at least one of: financial data, intellectual property data, employee data, location data, and development projects data.

8. The method of claim 1, wherein:

the operation is an action performed based on: the user identifier of the querying user, the at least one user identifier, and a set of network data.

9. The method of claim 1, wherein:

the operation is a listing (i) performed based on: the user identifier of the querying user, and the at least one operation parameter, and (ii) returns as the operation results a set of users associated to the at least one operation parameter.

10. The method of claim 1, wherein registering a user, by the social network application, comprises:

querying facts of the user recorded in the repository of facts, the querying locates the facts based on the recorded user identifier;

determining acceptance or rejection of the user's registration based on the queried facts; and recording in the repository of facts, the determined acceptance or rejection of the user's registration associated to the recorded user identifier.

11. The method of claim 1, wherein configuring the social network application comprises:

selecting, by a privileged owner of a social network application, a set of trusted fact attesters for attesting to facts related to registered users of the social network application;

selecting one of the set of trusted fact attesters to locate and attest to facts from the repository of facts for filtering and executing the initiated operation; and storing the set of trusted fact verifiers in the repository, and recording a subset of the trusted fact verifiers in the repository of facts.

12. The method of claim 8, wherein configuring the social network application further comprises:

selecting, by the user or the privileged owner of a social network application, a set of available parameters for filtering operations performed in the social network application;

storing the set of available parameters in a repository, and recording a subset of the available parameters in the repository of facts; and configuring each set of verification parameters based on querying the social network repository or the repository of facts to locate parameters of the set of available parameters.

13. The method of claim 1, wherein recording the facts in the repository of facts comprises:

providing by the user: a fact, evidence of the fact, a recorded user identifier, and user identification;

querying the repository of facts, by a fact attester, to provide a list of valid identification verifiers for the repository of facts, wherein selecting an identification verifier from the list;

requesting, by the fact attester, the selected identification verifier to determine whether the provided user identification matches recorded user identification associated to the recorded user identifier in the repository of facts;

if the provided user identification and the recorded user identification match, attesting, by the fact attester, whether the provided fact is supported by the provided evidence; and recording, by the fact attester, the fact and results of the attestation of the fact in the repository of facts associated to the recorded user identifier.

14. The method of claim 13, wherein the recording further records in the repository of facts at least one of: user identification, date, information related to the fact attester, and information related to the selected identification verifier.

15. The method of claim 13, wherein the recording encrypts the fact, such that only the user associated with the fact is enabled access to the fact from the repository of facts.

16. The method of claim 13, wherein recording the user identifier and user identification comprises:

determining, by an identification verifier, whether user identification presented by a user matches physical characteristics of the user; and if the presented identification and the physical characteristics match:

signing, by the user, a transaction indicating ownership of a user identifier;

recording in the repository of facts, by the identification verifier, the user identifier; and recording in the repository of facts, by the identification verifier, the presented user identification associated to the recorded user identifier.

17. The method of claim 16, wherein the recording records a hash of the presented identification, and wherein the hash is either encrypted or unencrypted.

18. The method of claim 16, wherein the user identification and physical characteristics are at least one of: (i) a photo identification and physical appearance of the user, and (ii) a voice identification and voice features of the user.

19. The method of claim 16, wherein the user is presented to the verifier in person or through an online application.

20. The method of claim 1, wherein computing a trust score of an attested-to fact retrieved from the repository of facts as a service based on factors used in attesting to the fact.

21. A computer system for executing operations in a social network application, the system comprises:
a social network processor implementing a social network application, the social network processor communicatively coupled to a repository of facts as a service, the social network processor configured to register users with the social network application, wherein the registering includes providing to the social network application user identifiers recorded in the repository of facts;
a user interface configured to:
enable each user to select and store in a social network repository coupled to the social network application: a set of verification parameters enabled to filter the participation of the respective user identifier in a set of operations; and
initiate, by a querying user, an operation through the social network application;
in response to the initiated operation, the social network processor configured to implement the social networking application to:
(a) query the repository of facts to locate attested-to facts specific to: a user identifier of the querying user or the user identifiers of the registered users; and
(b) filter participation of at least one user identifier in the operation based on the located attested-to facts meeting the stored verification parameters; and
(c) execute the operation in accordance with the filtering, wherein, if the operation includes at least one operation parameter, the social network application returning operation results based on the located attested-to facts meeting the at least one operation parameter.

22. The system of claim 21, wherein:
the user interface further configured to:
for each user, configure and store in a repository coupled to the social network application: a set of operations enabled to include participation of a respective user identifier; and
the social network processor further configured to:
execute the operation for a given user identifier only if determining, by searching the social network repository, that the operation is included in the stored set of enabled operations for the given user identifier.

23. The system of claim 21, wherein each of the user identifiers is at least one of: a public key recorded in the repository of facts, or a text identifier associated with one or more public keys.

24. The system of claim 21, wherein the repository of facts as a service is a blockchain.

25. The system of claim 24, wherein the social network application is a decentralized application of the blockchain, or a centralized application that calls the blockchain.

26. The system of claim 21, wherein the user is a person, and the verification parameters and the operation parameters include at least one of: network data, verified experience data, medical data, university data, financial data, employment data, and personal data.

27. The system of claim 21, wherein the user is an entity, and the verification parameters and the operation parameters include at least one of: financial data, intellectual property data, employee data, location data, and development projects data.

28. The system of claim 21, wherein:
the operation is an action performed by the social network processor based on: the user identifier of the querying user, the at least one user identifier, and a set of network data.

29. The system of claim 21, wherein:
the operation is a listing (i) performed by the social network processor based on: the user identifier of the querying user, and the at least one operation parameter, and (ii) returns as the operation results a set of users associated to the at least one operation parameter.

30. The system of claim 21, wherein the social network processor is further configured to register a user by:
querying facts of the user recorded in the repository of facts, the querying locates the facts based on the recorded user identifier;
determining acceptance or rejection of the user's registration based on the queried facts; and
recording in the repository of facts, the determined acceptance or rejection of the user's registration associated to the recorded user identifier.

31. The system of claim 21, wherein the social network processor is configured to register the social network application by:
selecting, by a privileged owner of a social network application, a set of trusted fact attesters for attesting to facts related to registered users of the social network application;
selecting one of the set of trusted fact attesters to locate and attest to facts from the repository of facts for filtering and executing the initiated operation; and
storing the set of trusted fact verifiers in the repository, and recording a subset of the trusted fact verifiers in the repository of facts.

32. The system of claim 31, wherein the social network processor is further configured to register the social network application by:
selecting, by the user or the privileged owner of a social network application, a set of available parameters for filtering operations performed in the social network application;
storing the set of available parameters in a repository, and recording a subset of the available parameters in the repository of facts; and
configuring each set of verification parameters based on querying the social network repository or the repository of facts to locate parameters of the set of available parameters.

33. The system of claim 21, wherein the social network processor is configured to record the facts in the repository of facts by:
providing by the user: a fact, evidence of the fact, a recorded user identifier, and user identification;
querying the repository of facts, by a fact attester, to provide a list of valid identification verifiers for the repository of facts, wherein selecting an identification verifier from the list;
requesting, by the fact attester, the selected identification verifier to determine whether the provided user identification matches recorded user identification associated to the recorded user identifier in the repository of facts;

if the provided user identification and the recorded user identification match, attesting, by the fact attester, whether the provided fact is supported by the provided evidence; and recording, by the fact attester, the fact and results of the attestation of the fact in the repository of facts associated to the recorded user identifier.

34. The system of claim 33, wherein the social network processor is configured to record in the repository of facts at least one of: user identification, date, information related to the fact attester, and information related to the selected identification verifier.

35. The system of claim 33, wherein the social network processor is configured to encrypt the fact in the recording, such that only the user associated with the fact is enabled access to the fact from the repository of facts.

36. The system of claim 33, wherein the social network processor is configured to record the user identifier and user identification by:

determining, by an identification verifier, whether user identification presented by a user matches physical characteristics of the user; and if the presented identification and the physical characteristics match:

signing, by the user, a transaction indicating ownership of a user identifier;

recording in the repository of facts, by the identification verifier, the user identifier; and recording in the repository of facts, by the identification verifier, the presented user identification associated to the recorded user identifier.

37. The system of claim 36, wherein the social network processor is configured to record a hash of the presented identification, and wherein the hash is either encrypted or unencrypted.

38. The system of claim 36, wherein the user identification and physical characteristics are at least one of: (i) a photo identification and physical appearance of the user, and (ii) a voice identification and voice features of the user.

39. The system of claim 36, wherein the user is presented to the verifier in person or through an online application.

40. The system of claim 21, wherein the social network processor is configured to compute a trust score of an attested-to fact retrieved from the repository of facts as a service based on factors used in attesting to the fact.

41. A computer program product comprising:

a non-transitory computer-readable storage medium having code instructions stored thereon, the storage medium operatively coupled to a processor such that, when executed by the processor, the computer code instructions cause the processor to:

register users with a social network application communicatively coupled to a repository of facts as a service, wherein the registering includes providing to the social network application user identifiers recorded in the repository of facts;

for each user, configure and storing in a repository coupled to the social network application: a set of verification parameters enabled to filter the participation of the respective user identifier in a set of operations;

initiate, by a querying user, an operation through the social network application, wherein:

(a) query the repository of facts to locate attested-to facts specific to: a user identifier of the querying user or the user identifiers of the registered users; and (b) filter participation of at least one user identifier in the operation based on the located attested-to facts meeting the stored verification parameters; and execute the operation in accordance with the filtering, wherein, if the operation includes at least one operation parameter, returning operation results based on the located attested-to facts meeting the at least one operation parameter.

* * * * *